J. E. WINDLE.
ATTACHMENT FOR TURRET LATHES.
APPLICATION FILED NOV. 15, 1909.

1,001,109.

Patented Aug. 22, 1911.

Witnesses:
E. H. Waite
Norman J. MacGaffin

Inventor,
John E. Windle;
By A. B. Upham
Attorney.

UNITED STATES PATENT OFFICE.

JOHN E. WINDLE, OF WORCESTER, MASSACHUSETTS.

ATTACHMENT FOR TURRET-LATHES.

1,001,109. Specification of Letters Patent. Patented Aug. 22, 1911.

Application filed November 15, 1909. Serial No. 528,162.

*To all whom it may concern:*

Be it known that I, JOHN E. WINDLE, a citizen of the United States, residing in the city and county of Worcester and Commonwealth of Massachusetts, have invented certain new and useful Improvements in Attachments for Turret-Lathes, of which the following is a specification.

The object of this invention is the construction of improved means for turning rods in the production of bolts and the like by means of a turret lathe; such means comprising both a support for the turning or cutting tool, and back-rests for the rod being worked upon.

Figure 1:
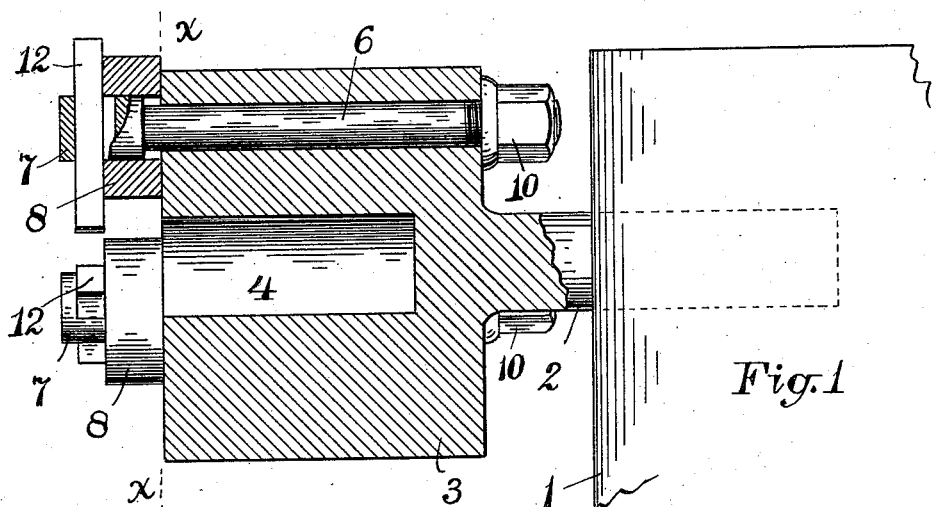
Figures 2, 3:
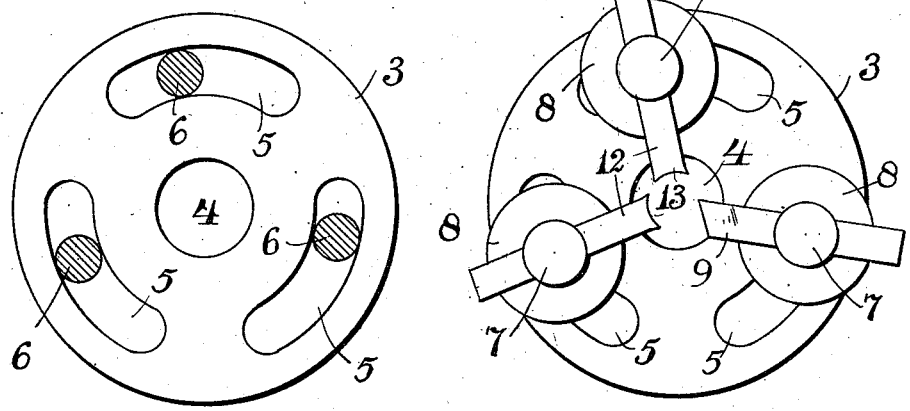
Figure 4:
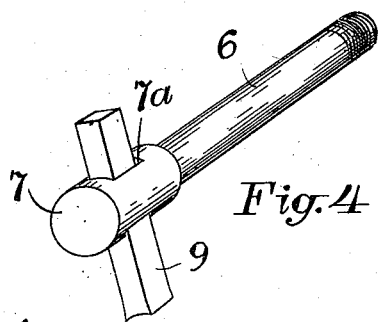

Referring to the drawings forming part of this specification, Figure 1 is a side view of a portion of the turret of a turret lathe, showing in central longitudinal section an attachment embodying my invention. Fig. 2 is an end view of the latter. Fig. 3 is a cross section of the same on the line X—X in Fig. 1. Fig. 4 is a perspective view of one of the holding bolts composing a part of the invention.

The turret lathe and the turret 1 do not differ in any way from those now on the market, the attachment being held by the latter by means of its stem 2 in the usual way. Rigid with said stem and preferably integral therewith, is a cylindrical head 3 having an axial opening 4 extending deeply into its exposed end. Parallel with said opening and axis are several slots 5, preferably three in number, and reaching from end to end of the head 3. As shown in Fig. 3, these slots are curved concentric with the head, and each loosely receives a bolt 6. Each said bolt is formed with a head 7 having a transverse rectangular hole through it, as indicated at 7ª in Fig. 4. Such head is somewhat elongated and fits loosely a thick washer 8, as illustrated in Figs. 1 and 2; the bolt and its head being shown in Fig. 4 in perspective. Through the hole 7ª in one of these bolts is passed a cutting tool, as 9 in Fig. 2, which is firmly secured in place against the face of its washer 8 by means of the nut and washer 10, 11 at the inner face of the head 3. Held in the same manner by each of the other two bolts is a back-rest consisting of a rectangular bar 12 having a curved seat 13 at its inner end. The two seats 13 thus provided compose the back-rest desired for the rod being turned. In using this attachment, said back-rest is adjusted by loosening the nuts 10 of the two bolts holding the bars 12, and forcing said seats into contact with the surface of the rod to be turned; such rod being rotated by the live-stock of the lathe in the usual way. Said bolts are then made fast by tightening up their nuts, and the tool point 9 is similarly adjusted to turn the desired chip from the said rod.

The lathe-turret being retracted and the attachment head and its opening 4 brought into alinement with the rod to be turned, the turret is slowly forced forward, bringing the back-rest behind the rod-end and engaging the cutting tool therewith. During this cutting, the back-rest keeps the rod from chattering and insures smooth and uniform turning thereof. The turret having been forced forward far enough to properly turn down the bolt or pin for which the lathe is set, the turret is retracted, the bolt or pin cut off, and the operation repeated.

The openings 5 are made the laterally extended slots illustrated, in order to provide requisite adjustment for the back-rest and the cutting tool. In the first place, the elevation of the nose of the cutting tool 9 must be changed to properly turn different diameters of rod in the manufacture of bolts and pins of different sizes. It is not sufficient to simply swing the tool to a different height at its nose, as it must always present the proper angle to its work, and this can only be done by sliding the tool bodily up or down. The elongated slot in which its confining bolt 6 is held permits this combined adjustment both angularly and bodily. Similarly the back-rest members 12 need to be adjusted both longitudinally, angularly and bodily, in order to suitably support the work; changes in the diameters of the rods being turned requiring the longitudinal adjustment of the said members, while the altered angle and position of the cutting tool renders necessary the bodily adjustment of said members to insure that there shall be no chattering of the work being operated upon.

What I claim as my invention and for which I desire Letters Patent is as follows, to wit:—

1. A rod turning attachment comprising a head, having a central longitudinal opening through it, and three laterally extended openings parallel with and equidistant from said central opening, a bolt in each of the laterally extended openings, a cutting tool carried by one of said bolts, back-rest members carried by the other of said bolts, and nuts for said bolts adapted to secure said parts tightly in place.

2. An attachment for turret lathes comprising a head having means for rigid fastening to the turret of said lathe, a central longitudinal opening in said head, and a plurality of longitudinal laterally extended openings about the first-named opening, a bolt in each of the laterally extended openings having a transversely apertured head, a washer loosely encircling each said apertured head, a cutting tool located in the apertured head of one of said bolts, back-rest members located in the apertured heads of the other of said bolts, and nuts on the inner ends of said bolts for fastening said parts in place.

3. An attachment for turret lathes comprising a cylindrical head having a stem adapted to be rigidly held by the turret of such lathe, a central longitudinal opening in the same, and three longitudinal openings extended concentric with the first-named opening, a bolt located in each extended opening having an apertured head, nuts for said bolts, a washer encircling each bolt-head, and turning and supporting members held in said apertured heads.

In testimony that I claim the foregoing invention, I have hereunto set my hand this 8th day of November, 1909.

JOHN E. WINDLE.

Witnesses:
A. B. UPHAM,
E. T. TILTON.

---

Copies of this patent may be obtained for five cents each, by addressing the "Commissioner of Patents, Washington, D. C."